(12) United States Patent
Singh et al.

(10) Patent No.: US 10,796,276 B1
(45) Date of Patent: Oct. 6, 2020

(54) SYSTEMS AND METHODS FOR ELECTRONIC PLATFORM FOR TRANSACTIONS OF WEARABLE ITEMS

(71) Applicant: CaaStle, Inc., New York, NY (US)

(72) Inventors: Jaswinder Pal Singh, New York, NY (US); Amy Kang, Richmond Hill, NY (US); Christine M. Hunsicker, New York, NY (US); Georgiy Goldenberg, Los Altos, CA (US); Dongming Jiang, Los Angeles, CA (US); Chirag Jain, Delhi (IN); Prashant Rao, Sunnyvale, CA (US); Prashant T R Rao, San Jose, CA (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 16/381,132

(22) Filed: Apr. 11, 2019

(51) Int. Cl.
*G06Q 10/08* (2012.01)
*G06Q 30/06* (2012.01)
*G06Q 10/06* (2012.01)

(52) U.S. Cl.
CPC ....... *G06Q 10/087* (2013.01); *G06Q 10/0633* (2013.01); *G06Q 10/06316* (2013.01); *G06Q 10/0833* (2013.01); *G06Q 10/0837* (2013.01); *G06Q 30/0633* (2013.01); *G06Q 30/0641* (2013.01); *G06Q 30/0645* (2013.01)

(58) Field of Classification Search
CPC ......... G06Q 10/0833; G06Q 10/06316; G06Q 10/0633; G06Q 10/087; G06Q 10/0837; G06Q 30/0633; G06Q 30/0641; G06Q 30/0645
See application file for complete search history.

(56) References Cited

U.S. PATENT DOCUMENTS

| | | | |
|---|---|---|---|
| 8,682,804 B1 * | 3/2014 | Yoon ................. | G06Q 30/0645 705/1.1 |
| 9,081,863 B2 | 7/2015 | Error et al. | |
| 9,619,535 B1 * | 4/2017 | Kapoor ................. | G06F 16/254 |
| 2002/0121980 A1 * | 9/2002 | Wan ...................... | G06Q 30/06 340/572.1 |

(Continued)

OTHER PUBLICATIONS

Nowicki, Tadeusz, Anna Saniuk, and Robert Waszkowski. "Clothing Distribution Optimization for Rental Company Warehouse." International Conference on Applied Human Factors and Ergonomics. Springer, Cham, 2018.*

*Primary Examiner* — Asfand M Sheikh
(74) *Attorney, Agent, or Firm* — Bookoff McAndrews, PLLC

(57) ABSTRACT

Disclosed are methods, systems, and non-transitory computer-readable medium for dynamically managing data associated with transactions of wearable items. For example, a method may include receiving wearable item data from one or more electronic tenant interfaces, hosting an electronic warehouse operations portal and/or an electronic administrative portal, receiving one or more electronic user transactions initiated at one or more user platforms, updating one or more transaction databases and one or more analytics databases, based on the one or more electronic user transactions, receiving one or more wearable item operations requests, initiating one or more microservices to fulfill the one or more wearable item operations requests, and updating at least one of the one or more transaction databases and one or more analytics databases based on completion of the one or more wearable item operations requests.

20 Claims, 5 Drawing Sheets

(56) References Cited

U.S. PATENT DOCUMENTS

| | | | |
|---|---|---|---|
| 2002/0143655 A1* | 10/2002 | Elston | H04L 29/06 |
| | | | 705/26.81 |
| 2003/0023514 A1 | 1/2003 | Adler et al. | |
| 2004/0143518 A1 | 7/2004 | Siegel | |
| 2005/0114221 A1 | 5/2005 | Walters et al. | |
| 2008/0010173 A1* | 1/2008 | Rendich | G06Q 10/02 |
| | | | 705/28 |
| 2008/0294996 A1 | 11/2008 | Hunt et al. | |
| 2010/0262521 A1 | 10/2010 | Robinson et al. | |
| 2012/0158553 A1* | 6/2012 | Sudhidhanakul | G06Q 10/087 |
| | | | 705/28 |
| 2012/0246110 A1* | 9/2012 | Fischer | G06F 16/283 |
| | | | 707/602 |
| 2013/0085814 A1* | 4/2013 | Sharpe | G06Q 10/06311 |
| | | | 705/7.39 |
| 2013/0151371 A1* | 6/2013 | Moss | G06Q 30/0633 |
| | | | 705/26.8 |
| 2013/0211973 A1* | 8/2013 | Tomlinson | G06Q 10/087 |
| | | | 705/28 |
| 2014/0025533 A1 | 1/2014 | Lv | |
| 2014/0279186 A1* | 9/2014 | Juan | G06Q 30/0631 |
| | | | 705/26.7 |
| 2014/0379507 A1 | 12/2014 | Pitt | |
| 2015/0142855 A1* | 5/2015 | Fast | H04L 67/10 |
| | | | 707/803 |
| 2015/0302505 A1 | 10/2015 | Di et al. | |
| 2015/0317719 A1 | 11/2015 | Berg et al. | |
| 2017/0091844 A1* | 3/2017 | Yarvis | G06Q 30/016 |
| 2017/0243282 A1* | 8/2017 | Koulis | G06Q 30/0645 |
| 2019/0347668 A1* | 11/2019 | Williams | H04L 51/02 |
| 2020/0005116 A1 | 1/2020 | Kuo | |

* cited by examiner

SYSTEMS AND METHODS FOR ELECTRONIC PLATFORM FOR TRANSACTIONS OF WEARABLE ITEMS

TECHNICAL FIELD

Various embodiments of the present disclosure generally relate to an electronic platform for distribution of wearable items and, more particularly, to dynamically managing electronic data associated with purchase, rental, or subscription-based online transactions of wearable items.

BACKGROUND

For online subscription-based services or retail transactions, a key driver for maintaining user satisfaction is ensuring that the underlying electronic data is easily accessible, dynamically updated, and reliably maintained. Such an objective may be important not only for the quality of service and interface provided to the front-end users, but also for ensuring that the back office staff and/or the business partners of integrated systems are provided with an up-to-date, and reliable electronic platform on which to operate. Each of those interfaces and components may contribute to the overall functioning of the entire electronic platform. For example, the functions reliably carried out by a user interface for warehouse associates may be important for the functioning of the organization's system as a whole, as they heavily contribute to the efficiency in handling and processing front-end users' order fulfillment. Thus, it may be highly desirable for an online service provider to streamline the system and the process in which different user interfaces, computer-implemented services, and automations integrate together in a connected platform, in such a way that customer actions and back office tasks trigger each others' responsive actions in an efficient manner, while some back office tasks run in the background based on automations and/or staff actions.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed to dynamically managing electronic data associated with transactions of wearable items.

In one embodiment, a computer-implemented method is disclosed for dynamically managing electronic data associated with transactions of wearable items. The computer-implemented method may comprise: receiving, by one or more processors, wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks; hosting, by the one or more processors, an electronic warehouse operations portal and an electronic administrative portal, the electronic warehouse operations portal and electronic administrative portal comprising user interfaces accessible from one or more employee devices over the one or more networks; receiving, by the one or more processors, one or more electronic user transactions initiated at one or more user platforms, each of the one or more electronic user transactions associated with at least one unique user identifier and at least one unique item identifier identifying wearable item described in the received wearable item data, wherein the one or more user platforms comprise one or more user interfaces accessible from one or more user devices over the one or more networks; in response to receiving the one or more electronic user transactions, updating, by the one or more processors, one or more transaction databases and one or more analytics databases, based on the one or more electronic user transactions; receiving, by one or more processors, one or more wearable item operations requests from at least one of the electronic warehouse operations portal, the electronic administrative portal, and the one or more electronic tenant interfaces to initiate order processing of a wearable item identified by the unique user identifier and the unique item identifier for a user identified by the received unique user identifier; in response to receiving the one or more wearable item operations requests, initiating one or more microservices to fulfill the one or more wearable item operations requests; and updating at least one of the one or more transaction databases and one or more analytics databases based on completion of the one or more wearable item operations requests.

In accordance with another embodiment, a computer system is disclosed for dynamically managing electronic data associated with transactions of wearable items. The computer system may comprise: a memory having processor-readable instructions stored therein; and at least one processor configured to access the memory and execute the processor-readable instructions, which when executed by the processor configures the processor to perform a plurality of functions, including functions for: receiving wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks; hosting an electronic warehouse operations portal and an electronic administrative portal, the electronic warehouse operations portal and electronic administrative portal comprising user interfaces accessible from one or more employee devices over the one or more networks; receiving one or more electronic user transactions initiated at one or more user platforms, each of the one or more electronic user transactions associated with at least one unique user identifier and at least one unique item identifier identifying wearable item described in the received wearable item data, wherein the one or more user platforms comprise one or more user interfaces accessible from one or more user devices over the one or more networks; in response to receiving the one or more electronic user transactions, updating one or more transaction databases and one or more analytics databases, based on the one or more electronic user transactions; receiving one or more wearable item operations requests from at least one of the electronic warehouse operations portal, the electronic administrative portal, and the one or more electronic tenant interfaces to initiate order processing of a wearable item identified by the unique user identifier and the unique item identifier for a user identified by the received unique user identifier; in response to receiving the one or more wearable item operations requests, initiating one or more microservices to fulfill the one or more wearable item operations requests; and updating at least one of the one or more transaction databases and one or more analytics databases based on completion of the one or more wearable item operations requests.

In accordance with another embodiment, a non-transitory computer-readable medium containing instructions is disclosed for dynamically managing electronic data associated with transactions of wearable items. The non-transitory computer-readable medium may comprise instructions for: receiving wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks; hosting an electronic warehouse operations portal and an electronic administrative portal, the electronic warehouse operations portal and electronic administrative portal comprising user interfaces accessible from one or more employee devices over the one or more networks; receiving one or more electronic user transactions initiated at one or more user platforms, each of the one or more electronic user transactions associated with at least one unique user identifier and at least one unique item identifier identifying wearable item described in the received wearable item data, wherein the one or more user platforms comprise one or more user interfaces accessible from one or more user devices over the one or more networks; in response to receiving the one or more electronic user transactions, updating one or more transaction databases and one or more analytics databases, based on the one or more electronic user transactions; receiving one or more wearable item operations requests from at least one of the electronic warehouse operations portal, the electronic administrative portal, and the one or more electronic tenant interfaces to initiate order processing of a wearable item identified by the unique user identifier and the unique item identifier for a user identified by the received unique user identifier; in response to receiving the one or more wearable item operations requests, initiating one or more microservices to fulfill the one or more wearable item operations requests; and updating at least one of the one or more transaction databases and one or more analytics databases based on completion of the one or more wearable item operations requests.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
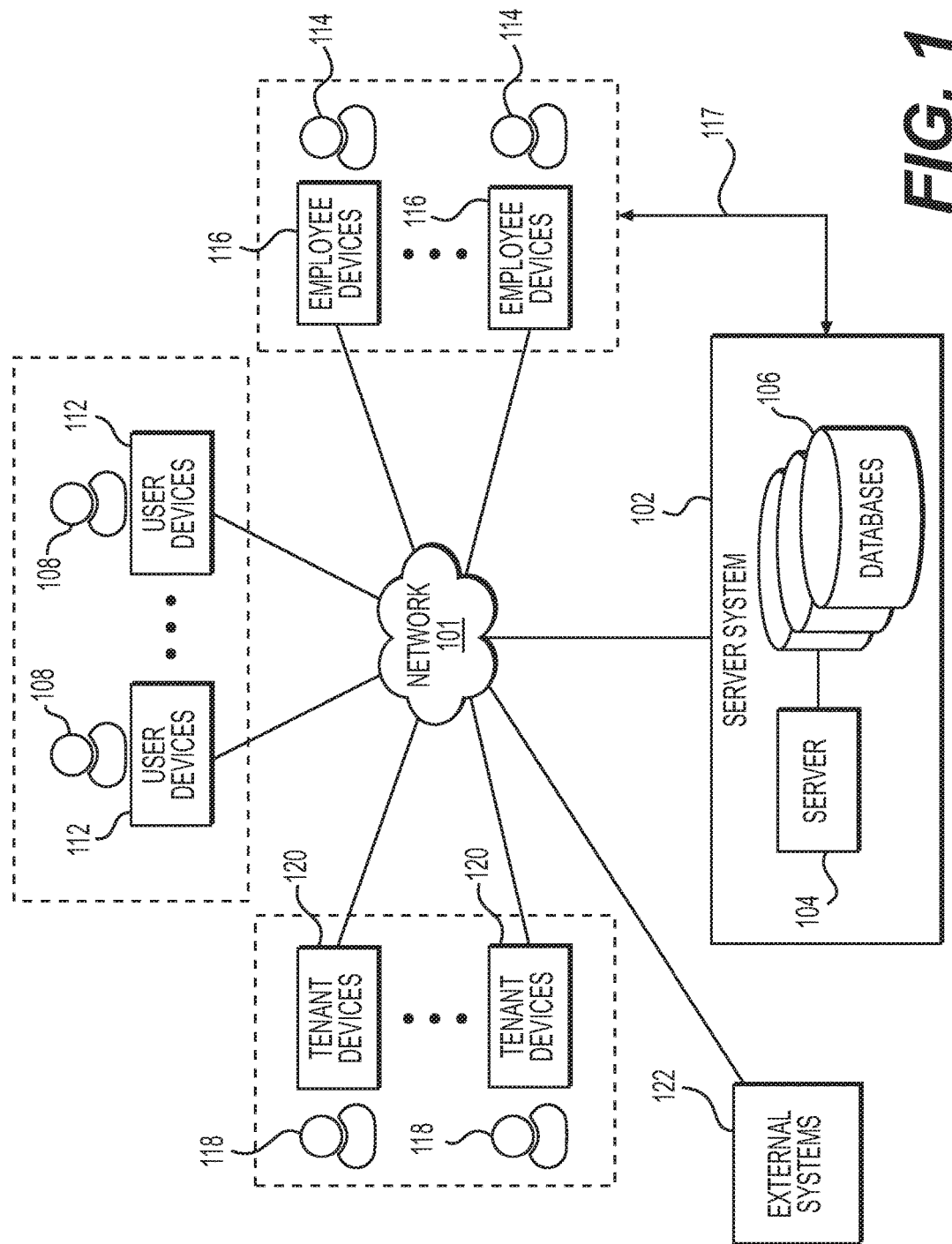
FIG. 1 depicts an example environment in which methods, systems, and other aspects of the present disclosure may be implemented.

The following embodiments describe systems and methods for dynamically managing data associated with apparel or other wearable item subscriptions. As noted above, there exists a need to streamline an online subscription/retail servicing system and a process in which different user interfaces, computer-implemented services, and automations integrate together in a connected platform, in such a way that customer actions and back office tasks trigger each others' responsive actions in an efficient manner, while some back office tasks run in the background based on unique automation tasks and/or staff actions.

While the exemplary system architecture as described in the present disclosure relates to electronic transactions for subscribing to, purchasing, or renting wearable items (e.g., clothing-as-a-service (CaaS) or Try-Then-Buy (TTB) service), implementations disclosed herein may effectively serve various other online transactions in the context of any other subscription, purchase, rental, or retail services without departing from the scope of the disclosure, such as, for example, subscribing to or making purchases in a software service, cleaning service, delivery service, maintenance service, rental product, rental vehicles, etc. In addition, while some descriptions and examples disclosed in the present disclosure refer to certain exemplary transactions as transactions pertaining to "apparel" or "garments," all of those transactions may effectively serve any wearable item (e.g., an article of clothing, apparel, jewelry, hat, accessories, or any other product which may be worn), or even hospitality linens, consumer goods, or any other textile fabrics, without departing from the scope of the disclosure.

As used in the present disclosure, the term "CaaS" (i.e., clothing-as-a-service) may collectively refer to computer-implemented services and functions associated with subscription, purchase, and/or rental services for users (e.g., periodic subscription for receiving wearable items, apparel rental or purchase order, distribution, return processing, TTB services, account management, marketing, customer service, warehouse operations, etc.). As used in the present disclosure, the term "wearable item" may refer to any article of clothing, apparel, jewelry, hat, accessories, or other product which may be worn by a person, an animal, or a thing, or be used as an ornament for a person, an animal, or a thing. As used herein, the term "closeting" or "to closet" may refer to a computer-implemented operation of placing one or more garments into a virtual closet (e.g., a cart, a repository, or any type of space which may be virtually associated with a particular set of one or more garments for a future transaction). Additionally, "matching" may refer to a computer-implemented operation of determining a set of one or more garments for allocating to a user and/or determining wearability metrics for given garments, and "allocating" or "allocation" may refer to a computer-implemented operation of determining the garments that should be assigned and shipped to one or more particular users.

In accordance with the present disclosure, user interfaces, periodically executed computer-implemented services, ad hoc services, and automations being integrated together in a connected platform may be achieved by a uniquely configured system architecture, job execution cluster configuring one or more processors to perform both storefront and back office tasks, and various user interfaces providing specialized or customized access to users of different roles. For example, the system may periodically collect vast amounts of data attributes from historical transactions, form data sets indicative of each user's relationship with certain apparel (e.g., a binary flag of whether a shipped garment was actually worn by a user) in the back end, and train a neural network with those data sets to make specific front-end user recommendations with highly wearable apparel. The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more networks 101 that interconnect a server system 102, user devices 112, employee devices 116, tenant devices 120, and external systems 122. The one or more networks 101 may be, for example, one or more of a cellular network, a public land mobile network, a local area network, a wide area network, a metropolitan area network, a telephone network, a private network, an ad hoc network, an intranet, the Internet, a fiber optic based network, a cloud computing network, etc. User devices 112 may be accessed by users 108, employee devices 116 may be accessed by authorized employees 114, and tenant devices 120 may be accessed by employees of tenant entities 118. In some implementations, employee devices 116 may be used to perform the functions of the tenant devices 120 and/or the user devices 112. Server system 102 may comprise one or more servers 104 and one or more databases 106, which may be configured to store and/or process a plurality of data, microservices, and service components, and/or associated functions thereof, as described in more detail below with respect to FIGS. 2 and 3.

Users 108 may access the server system 102 through the one or more networks 101 using user devices 112. Each device among the user devices 112 may be any type of computing device (e.g., personal computing device, mobile computing devices, etc.) which allows users 108 to display a web browser or a web-based application for accessing the server system 102 through the network 101. The user devices 112 may, for example, be configured to display a web browser, a web-based application, or any other user interface (e.g., one or more mobile applications) for allowing users 108 to exchange information with other device(s) or system(s) in the environment 100 over the one or more networks 101. For example, a device among the user devices 110 may load an application with a graphical user interface (GUI), and the application may display on the GUI one or more apparel recommendations for closeting by the user. Users 108 accessing user devices 112 may be, for example, users and/or potential users of apparel made available for subscription-based distribution via electronic transactions and physical shipment. Additionally, or alternatively, users 108 may access user devices 112 to, for example, manage one or more user accounts, view catalogs, configure one or more user profiles, engage in customer service communications, make purchase orders, track shipments, generate shipments, monitor order fulfillment processes, initiate or process returns, order apparel for purchase, provide feedback, refer other users, navigate through various features such as size advisor, perform personalized discovery, and/or make recommendations.

Employee devices 116 may be configured to be accessed by one or more employees 114, including, for example, customer service employees, marketer employees, warehouse employees, analytics employees, or any other employees who are authorized and/or authenticated to perform tasks, operations, and/or transactions associated with the server system 102, and/or the external systems 122. In one embodiment, employee devices 116 are owned and operated by the same entity or at least an affiliate of the entity operating the e-commerce (e.g., CaaS) business hosted on server systems 102. Each device among the employee devices 116 may be any type of computing device (e.g., personal computing device, mobile computing devices, etc.). The employee devices 116 may allow employees 114 to display a web browser or an application for accessing the server system 102 and/or the external systems 122, through the one or more networks 101. For example, a device among the one or more of the employee devices 116 may load an application with graphical user interface (GUI), and the application may display on the GUI one or more warehouse operations associated with providing CaaS to users 108. In some implementations, the employee devices 116 may communicate directly with the server system 102 via communications link 117 bypassing public networks 101. Additionally, or alternatively, the employee devices 116 may communicate with the server system 102 via network 101 (e.g., access by web browsers or web-based applications).

Tenant devices 120 may be configured to be accessed by one or more tenants 118. Each device among the tenant devices 120 may be any type of computing device (e.g., personal computing device, mobile computing devices, etc.). As used herein, each tenant, among one or more tenants 118, may refer to an entity that allocates and/or supplies one or more specific collections of apparel for the CaaS inventory. For example, each of the one or more tenants 118 may be a retailer, a designer, a manufacturer, a merchandizer, or a brand owner entity that supplies one or more collections of wearable items to the CaaS inventory managed and/or accessed by the server system 102. As described in more detail below with respect to FIG. 3, tenants 118 may use one or more electronic tenant interfaces (e.g., a catalog content management system associated with each tenant) to provide the server system 102 with wearable item data that describe apparel or wearable items made available for electronic transactions on server system 102. For example, one or more catalogs for each of the one or more tenants 118 may be generated and/or updated at the server system 102 dynamically and/or periodically. Tenant devices 120 may serve as access terminals for the tenants 118, for communicating with the electronic tenant interfaces and/or other subsystems hosted at the server system 102. The tenant devices 120 may, for example, be configured to display a web browser, an application, or any other user interface for allowing tenants 118 to load the electronic tenant interfaces and/or exchange data with other device(s) or system(s) in the environment 100 over the one or more networks 101.

External systems 122 may be, for example, one or more third party and/or auxiliary systems that integrate and/or communicate with the server system 102 in performing various CaaS tasks. Specific examples of the external systems 122 are described in detail below with respect to FIGS. 2 and 3. External systems 122 may be in communication with other device(s) or system(s) in the environment 100 over the one or more networks 101. For example, external systems 122 may communicate with the server system 102 via API (application programming interface) access over the one or more networks 101, and also communicate with the employee devices 116 via web browser access over the one or more networks 101.

As indicated above, FIG. 1 is provided merely as an example. Other examples that differ from the example environment 100 of FIG. 1 are contemplated within the scope of the present embodiments. In addition, the number and arrangement of devices and networks shown in system 100 are provided as an example. In practice, there may be additional devices, fewer devices and/or networks, different devices and/or networks, or differently arranged devices and/or networks than those shown in system 100. Furthermore, two or more devices shown in FIG. 1 may be implemented within a single device, or a single device shown in FIG. 1 may be implemented as multiple, distributed devices. Additionally, or alternatively, one or more devices may perform one or more functions of other devices in the example environment 100. For example, employee devices 116 may be configured to perform one or more functions of tenant devices 120, in addition to their own functions.

Figure 2:
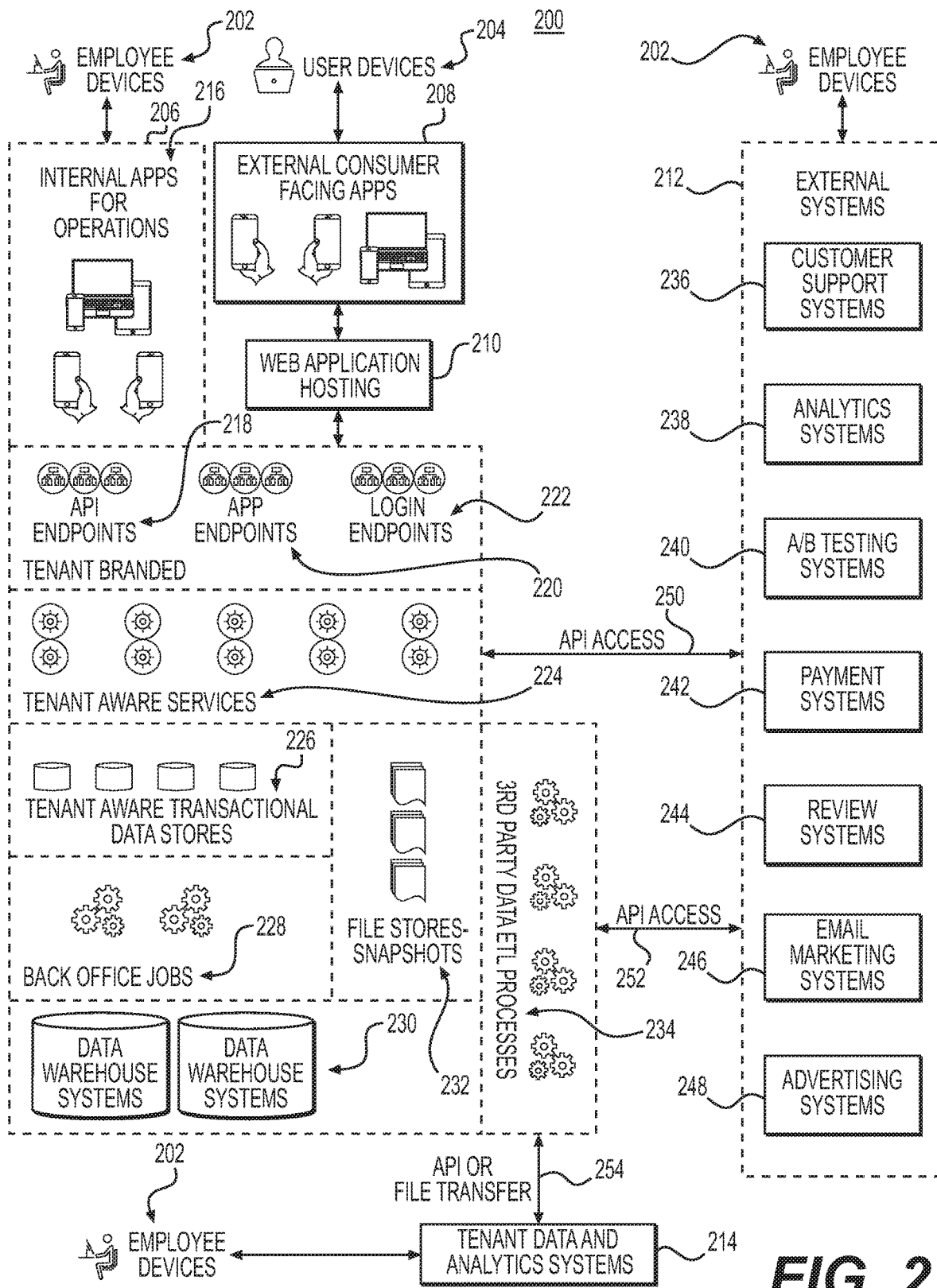
FIG. 2 depicts a schematic diagram depicting an architecture of an exemplary environment for a clothing-as-a-service electronic platform, according to one or more embodiments.

FIG. 2 depicts a schematic diagram of an exemplary architecture 200 for a clothing-as-a-service electronic platform, according to one or more embodiments. The components of the architecture may be accessed by authorized terminals, such as employee devices 202 and user devices 204, over the one or more networks 101 or via any one or more other types of network (e.g., a cellular network, a public land mobile network, a local area network, a wide area network, a metropolitan area network, a telephone network, a private network, an ad hoc network, an intranet, the internet, a fiber optic based network, a cloud computing network, etc.). As used herein, the user devices 204 may correspond to any one or more user devices 112 depicted in FIG. 1, and the employee devices 202 may correspond to any one or more of the employee devices 116 and/or tenant devices 120 depicted in FIG. 1.

As shown in FIG. 2, in general, architecture 200 may comprise an internal system 206, external consumer facing apps 208, a web application hosting server 210, external systems 212, and tenant data and analytics systems 214. Internal system 206 may comprise internal apps for operations 216, API endpoints 218, app endpoints 220, login endpoints 222, tenant aware services 224, tenant aware transactional data stores 226, back office jobs 228, data warehouse systems 230, file stores-snapshots 232, and $3^{rd}$ party data ETL processes 234.

In operation, employee devices 202 may access the internal system 206, which may be stored at networked, distributed, and/or local systems (e.g., one or more virtual private clouds and/or one or more physical private networks). As used herein, a virtual private cloud may refer to a configurable pool of shared computing resources within a cloud environment, with groups of shared computing resources being allocated for a particular job(s), user(s) and/or a purpose(s). The outer boundary of the internal system 206 depicted in dotted lines, encompassing all subcomponents 216-234, may represent a virtual private cloud allocated for hosting the entirety of the internal system 206. Additionally, the inner boundaries within the internal system 206, also depicted in dotted lines, may indicate multiple virtual private clouds (e.g., subsets of the larger virtual private cloud encompassing the internal system 206), each allocated for one or more particular tasks, users, or purposes (e.g., tenant aware services 224, back office jobs 228, and data warehouse systems 230).

The employee devices 202 may communicate with the internal system 206 through one or more internal apps 216 comprising one or more web-based portals or user interfaces for operations. The one or more internal apps 216 may be, for example, an electronic warehouse operations portal and/or an electronic administrative portal, as described in more detail below with respect to FIGS. 3 and 4. The one or more internal apps 216 may include one or more web-based user interfaces, such as, for example, one or more mobile applications compatible with predetermined mobile device operating systems, a software application developed for desktop operating systems, and/or a web site configured for browser access to web pages via one or more networks (e.g., the Internet or an intranet). Employees 116 or tenants 118 may use employee devices 202 to access the internal system 206 and perform various CaaS functions related to warehouse operations and/or administrative tasks, as described in more detail below with respect to FIG. 3.

The internal system 206 may also include Application Programming Interface ("API") endpoints 218, APP (application) endpoints 220, and login endpoints 222. In some implementations, these endpoints may be hosted in a virtual private cloud or a physical private network with a preconfigured level of isolation from other virtual private clouds or physical private networks hosting different components of the internal system 206. The API endpoints 218 may be locations from which the APIs can access resources of the internal system 206 that the APIs need to carry out their functions. For example, the API endpoints 218 may specify where resources can be accessed by the APIs, while communicating with the APIs requesting information from the internal system 206. Similarly, the APP endpoints 220 may be the locations from which applications (e.g., applications in one or more internal apps 216) may access resources of the internal system 206 they need to carry out their functions, and the login endpoints 222 may be the touchpoints of any communication pertaining to logins (e.g., authentication and access control) associated with the internal system 206. For example, the login endpoints 222 may receive and process login communications, for internal apps 216 and/or external consumer facing applications 208. For some implementations, at least some endpoints among the API endpoints 218, APP endpoints 220, and login endpoints 222, may be tenant branded endpoints, designated to serve particular tenants 118.

The internal system 206 may additionally include tenant aware services 224 and tenant aware transactional data stores 226. The tenant aware services may include microservices for fulfillment of various CaaS operations hosted in one or more virtual private clouds or one or more physical private networks. For example, the microservices may include, for example, catalog data, account data, data services, customer service functions, marketing functions, warehouse functions, and/or other supporting functions, as described in more detail below with respect to microservices 356 depicted in FIG. 3. The tenant aware transactional data stores 226 may be one or more databases that store both raw and processed data resulting from operations of the tenant aware services 224, the endpoints 218-222, external systems 212, and/or tenant data and analytics systems 214. The tenant aware transactional data stores 226 may store, for example, transactional data, batch jobs data, searchable data including various analytics and attributes, event messages, and local logs of various raw data. In some implementations, the tenant aware transactional data stores 226 may correspond to some or all of the databases 374-382 depicted in FIG. 3.

The internal system 206 may additionally include back office jobs 228, which may comprise instructions, files, or executable applications configured to perform various back office tasks and/or computing resources to execute these instructions or applications. The back office jobs 228 may be hosted in, for example, one or more virtual private clouds. The back office jobs 228 may include, for example, all system components that run and update data (e.g., a first order data or any derived data) associated with the internal system 206. Such system components may include, for example, replenishment identifier (RID) generation service(s), size advisor data set, size advisor algorithmic preparation component(s), recommendation service(s), search data sets, etc. The back office jobs 228 may include, for example, ETL (extract, transform, and load) processes that comprise collecting data from multiple different sources (e.g., tenant aware transactional data stores 226), converting the collected data to other one or more preset formats as deemed necessary, and loading the data into the target database (e.g., data warehouse systems 230). The back office jobs 228 may also include, for example, periodic data refresh operations, periodic synchronization states among internal and external services, and automated tasks to run in the background at the internal system 206, as described in more detail below with respect to job execution cluster 346 depicted in FIG. 3.

The internal system 206 may include the file stores for snapshots 232 in one or more virtual private clouds or one or more physical private networks. The file stores of snapshots 232 may store snapshots capturing states of the internal system 206 at particular points in time. For example, each snapshot may capture settings, files, configurations, and the memory state of the components of the internal system 206. These snapshots may be restored upon request or scheduling, and when a snapshot is restored, settings, and/or the state of the internal system 206 may be returned to the states they were in at the time the snapshots was captured.

The internal system 206 may include third party data ETL processes 234, which may collect data from different external sources (e.g., external systems 212), convert the collected data to other one or more preset formats as deemed necessary, and load the data into one or more target databases (e.g., data warehouse systems 230 and/or tenant data and analytics system 214).

The internal system 206 may include the data warehouse systems 230 in one or more virtual private clouds or one or more physical private networks. As discussed above with respect to the back office jobs 228 and the third party data ETL processes 234, the data warehouse systems 230 may be the one or more target databases for ETL processes that collect data from various sources (e.g., the external systems 212 or the tenant aware transactional data stores 226). The data warehouse systems 230 may then utilize the collected data as, for example, parameters for business intelligence that reveals patterns, analytics, and insights for business decisions associated with the internal system 206. Such utilization for business intelligence may, for example, occur when the data warehouse systems 230 are used by one or more business reporting tools, as described in more detail below with respect to FIG. 3.

The exemplary environment 200 may include tenant data and analytics systems 214. The tenant data and analytics systems 214 may be computing resources in communication with one or more components of the internal system 206 in order to collect, store, and/or manage data and analytics associated with the one or more tenants 118. One or more of the tenant data and analytics systems 214 may be located remotely from the internal system 206 (e.g., at tenant servers). The tenant data and analytics systems 214 may communicate with the components of the internal system 206 using API access or file transfer link 254 over one or more networks 101. For example, the tenant data and analytics systems 214 may communicate with the API endpoints 218 of the internal system 206, or receive files from third party data ETL processes 234. The tenant data and analytics systems 214 may be accessed by employee devices 202, which may correspond to employee devices 116 or the tenant devices 120 depicted in FIG. 1.

As shown in FIG. 2, the exemplary environment 200 may also include user devices 204, which may correspond to the user devices 112 depicted in FIG. 1. Users 108 of the CaaS electronic platform may use the user devices 204 to access the internal system 206, as recipients of the services provided by the components of the internal system 206. For example, the users 108 of the user devices 204 may be one or more registered subscribers who physically receive and wear the items that are distributed via the CaaS electronic platform. As shown in FIG. 2, user devices 204 may access the internal system 206 via external consumer facing applications 208. The external consumer facing applications 208 may be browser-accessed web pages or web-based applications that include web-based user interfaces accessible from one or more user devices 204 over one or more networks (e.g., one or more networks 101).

In some implementations, the exemplary environment 200 may include web application hosting server 210 to serve as an intermediary for enabling communications made between the user devices 204 and the internal system 206. The web application hosting server may be an external (e.g. third party) server that provides an online platform for, for example, building a web-based storefront interface and integrating online retail components (e.g., online point-of-sale system) onto the storefront interface, for vendors such as the internal system 206. The web application hosting server 210 may communicate with the internal system 206 (e.g., the API endpoints 218, the APP endpoints 220, and/or an employee device 202 logged into the internal system 206), to retrieve necessary information about the internal system 206, and to generate or dynamically update an online storefront for the user devices 204. The user devices 204 may, in turn, access the online storefront generated or dynamically updated by the web application hosting server 210, through the external consumer facing applications 208. In this way, the external consumer facing applications 208 may allow user devices 204 to not only communicate with the internal system 206, but also to communicate with external systems 212. Such communication with the external systems 212 may be enabled by use of the API access communication links 250 and 252 interconnecting the internal system 206 and the external systems 212. For example, the external consumer facing applications 208 may access a platform in the customer support systems 236 at external systems 212, in order to allow a user 108 to submit a customer review or feedback.

The exemplary environment 200 may additionally include external systems 212 (e.g., systems corresponding to the external systems 122 depicted in FIG. 1), that may be accessed by employee devices 202 (e.g., devices corresponding to employee devices 116 and/or the tenant devices 120 depicted in FIG. 1), and also by the internal system 206 (e.g., the system corresponding to server system 102 depicted in FIG. 1). The employee devices 202 may access the external systems 212 over one or more networks, using, for example, web browser access or user interfaces included in one or more web-based application. Additionally, as shown in FIG. 2, the internal system 203 may also access the external systems over the one or more networks, using, for example, API access processes 250 and 252.

The external systems 212 may include, for example, customer support systems 236, analytics systems 238, A/B testing systems 240, payment systems 242, review systems 244, email marketing systems 246, and advertising systems 248. The customer support systems 236 may include cloud-based voice, contact center, video, mobile, and unified communications solutions provided by an external (e.g., third party) server. Additionally, or alternatively, the customer support systems 236 may include a customer data platform hosted by an external (e.g., third party) server, at which a user may log in and engage in interactive customer support, targeted campaigns, live chat support, call center support, and web-based messaging. The customer support systems 236 may be accessed by employee devices 202 (e.g., a vendor of these solutions) to, for example, customize settings, data, and/or configurations.

The analytics systems 238 may include one or more web analytics tools provided by an external (e.g., third party) server, that provides dashboards, logs, or reports pertaining to, for example, tracking and reporting website traffic for the vendor (e.g., employees 116). For example, an analytics tool may be configured to display poorly functioning pages, where visitors came from, how long the visitors stayed on the website, the visitors' geographical position, visitor segmentation information, sales activity and performance, and detailed information about current visitors. The analytics systems 238 may be accessed by employee devices 202 (e.g., a vendor of these solutions) to, for example, customize settings, data, and/or configurations, and utilize the analytics data for business intelligence.

A/B testing systems 240 may include A/B testing tools for measuring and optimizing user experience by, for example, measuring subjects' response to variant A against variant B and determining which of the two variants is more effective. The A/B testing tool may be provided by an external (e.g., third party) server. In the context of the CaaS electronic platform provided by the internal system 206, the A/B testing systems 240 may perform an A/B test on, for example, a closet interface with a virtual assistant and a closet interface without a virtual assistant. Results of the experimentations may be provided to employee devices 202 (e.g., a vendor of these solutions) to, for example, utilize the results for business intelligence.

The payment systems 242 may include online payment tools provided by an external (e.g., third party) server. For example, a payment tool may provide a cloud-based platform configured to accept payments from users online, or within the platform's mobile application in the users' devices (e.g., user devices 204 and/or user devices 112). A payment tool may also include, for example, payment processing components configured to process the accepted payments and/or attempted transactions, as well as an anti-fraud tool that detects fraudulent transactions using preset conditions and blocks the fraudulent transactions during the processing of the payment. The payment systems 242 may be accessed by employee devices 202 (e.g., a vendor of these solutions) to, for example, retrieve payments, customize settings, data, and/or configurations pertaining to user payments, and utilize payment analytics data for business intelligence.

The review systems 244 may include user review receiving tools provided by an external (e.g., third party) server. For example, a user review receiving tool in the review systems 244 may provide a platform for users to add reviews, ratings, and/or user generated content such as videos, to be published for display at the external consumer facing applications 208. The review systems 244 may be accessed by employee devices 202 (e.g., a vendor of these tools) to, for example, import reviews for analytics and business intelligence, and/or customize settings and configurations.

The email marketing systems 246 may include email marketing automation and analytics tools, provided by an external (e.g., third party) server. For example, an email marketing automation tool may maintain mailing lists and mailing schedules, and may modify email marketing messages based on what recipients read, click on, or forward. The email marketing systems 246 may be accessed by employee devices 202 (e.g., a vendor of these tools) to, for example, manage communication preferences, the content, and/or vendor subscription settings.

The advertising systems 248 may include web-based advertisement platforms at external (e.g., third party) advertisement platform providers. For example, the advertisement platform providers may be social network platforms or search engines that may display advertisements associated with the CaaS electronic platform of the internal system 206 at their own interfaces based on their users' keywords, behaviors, or historical transactions. The advertising systems 248 may be accessed by employee devices 202 (e.g., a vendor of these tools) to, for example, manage advertisement preferences, the content, and/or vendor subscription settings.

The number and arrangement of devices, components, and communication networks shown in FIG. 2 are provided as an example. In practice, there may be additional devices, components, and/or communication networks, fewer devices, components, and/or communication networks, different devices, components, and/or communication networks, or differently arranged devices, components, and/or communication networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
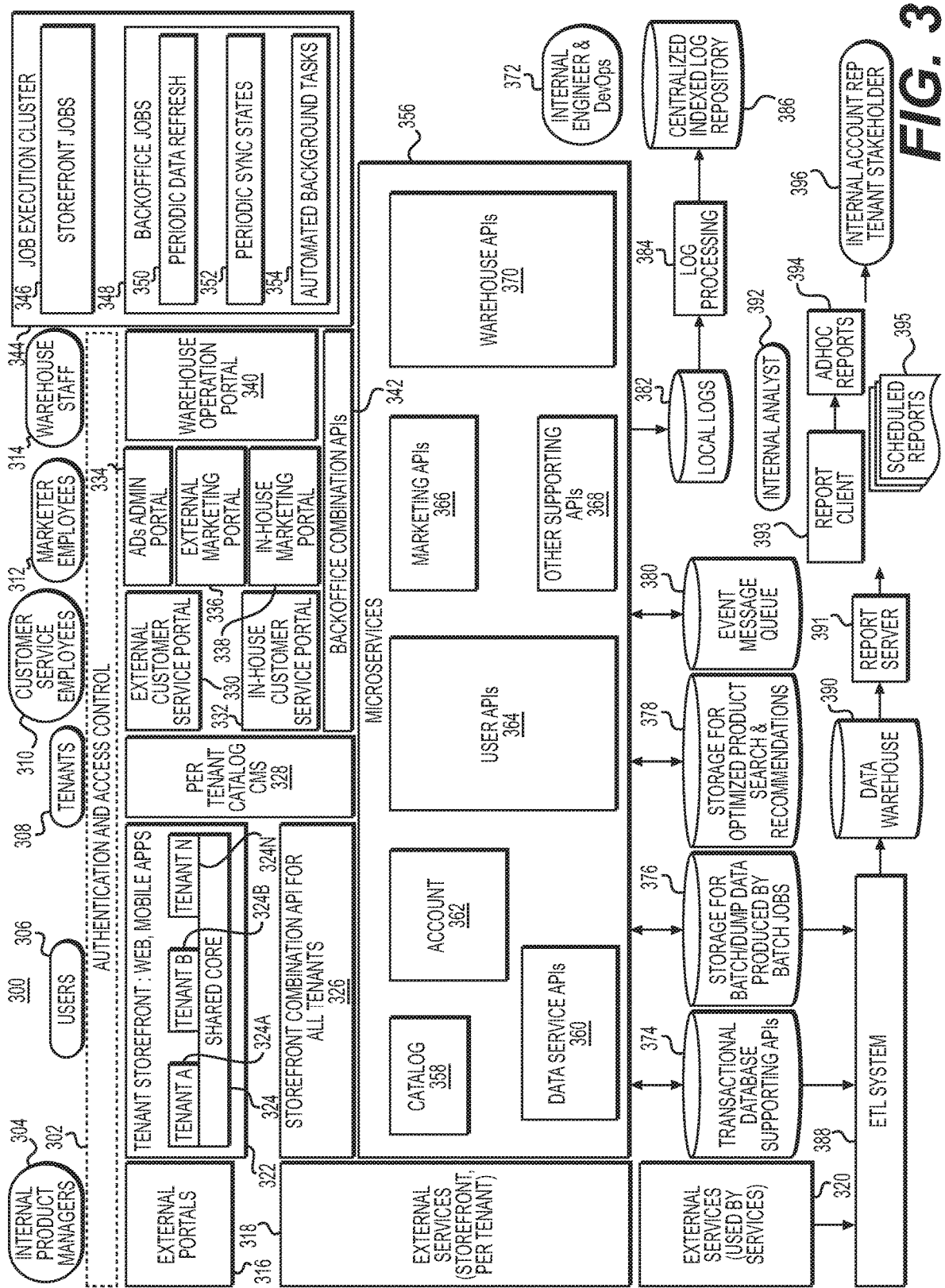
FIG. 3 depicts a schematic diagram depicting the architecture of an exemplary server system for a clothing-as-a-service electronic platform, according to one or more embodiments.

FIG. 3 depicts a diagram schematically showing the architecture an exemplary server system 300 for a clothing-as-a-service electronic platform, according to one or more embodiments. The server system 300 may correspond to the server system 102 depicted in FIG. 1, and to the internal system 206 depicted in FIG. 2.

The server system 300 may be accessed by a plurality of entities having different roles. For example, the server system 300 may be accessed by various employees of the CaaS electronic platform, such as internal product managers 304, customer service employees 310, marketer employees 312, and warehouse staff 314. The server system 300 may also be accessed by tenants 308, such as entities that allocate and/or supply one or more specific collections of apparel for the CaaS inventories. For example, the tenants 308 may correspond to tenants 118 depicted in FIG. 1. A tenant among the tenants 308 may be a retailer, a designer, a manufacturer, a merchandizer, or a brand owner entity that supplies a set of apparel to the CaaS inventory managed and/or accessed by the server system 300. Additionally, the server system 300 may be accessed by users 306. In some implementations, the users 306 may correspond to users 108 depicted in FIG. 1, and users of user devices 204 depicted in FIG. 2. Users 306 may use their computing devices (e.g., user devices 204) to access the server system 300, as recipients of the CaaS electronic platform services provided by the components of the server system 300. For example, the users 306 may be one or more registered subscribers who physically receive and wear the apparel that are distributed via the CaaS operations. The users 306 may log into the server system 300 to initiate tasks associated with one or more CaaS operations, such as, for example, account management, catalog viewing, closeting items, providing return notifications, etc.

Entities 304-314 may each access the server system 300 by communicating with an authentication and access control component 302. The authentication and access control component 302 may grant access to the server system 300 only if the access requesting entity is successfully authenticated based on the access control conditions corresponding to the particular entity. The access control conditions, which may be stored in a memory in communication with the server 300, may be applied to a particular entity based on various entity-specific factors, such as, for example, the authorized role(s) of each entity, the device being used by each entity, the portal sought to be accessed, and/or the geographic location of each entity.

At the server system 300, one or more internal product managers 304 may access external portals 316. The external portals 316 may be one or more portals (e.g., administrative user interface or vendor settings page) in connection with external (e.g., third party) services used by the server system 300. For example, the server system 300 may be in communication with a third-party service that provides web page analytics (e.g., as one of the analytics systems 238). In order to configure vendor settings at this analytics service, one or more internal product managers 304 may access the administrative user interface of this third-party web page analytics system as a vendor. Accordingly, the external portals 316 may be in communication with the external servers hosting the external (e.g., third party) services, such as the external services 318 and the external services 320.

The external services 318 may be services associated with tenant-specific storefronts, such as, for example, customer support services that may be provided at the tenant-specific storefronts, marketing and advertisement services that may bring users 306 into the tenant-specific storefronts, content management systems for building and updating each tenant-specific storefront, and analytics services for tracking and reporting the performance of the tenant-specific storefronts.

The external services 320 may be services used by the server system 300 for all users (e.g., across different tenant-specific storefronts), such as, for example, accounting services, customer review receiving services, email notification services, and payment services. In some implementations, the communication between one or more internal product managers 304 and external portals 316 for communicating with external services 318 and 320, shown in FIG. 3, may correspond to the communication between the employee devices 202 and the external systems 212 as depicted in FIG. 2.

At the server system 300, one or more users 306 may access the tenant storefront 322. The tenant storefront 322 may include web-based user interfaces which may be implemented as, for example, web sites, one or more web-based applications, and/or one or more mobile device applications. As shown, the tenant storefront 322 may include a different interface for each tenant, such as a storefront interface 324A unique to tenant A, a storefront interface 324B unique to tenant B, and a storefront interface 324N unique to tenant N. While storefront interfaces 324A-324N may be unique to each tenant, all tenant-specific interface may include a shared core 324 common to all tenants. In addition, the tenant storefront 322 may communicate with other components of the server system 300 (e.g., external services 318, per tenant catalog CMS 328, and/or microservices 356) using storefront combination API 326.

At the server system 300, one or more tenants 308 may access per tenant catalog content management system (CMS) 328. The per tenant catalog CMS 328 may comprise a portal that includes one or more user interfaces for communicating with tenants 308 to create, modify, and/or update one or more apparel catalogs for the tenant storefront 322 (e.g., catalogs in the storefront interface 324A for tenant A). In some implementations, the per tenant catalog CMS 328 may also be accessed by authorized employees associated with the server system 300, such internal product managers 304, marketer employees 312, or warehouse staff 314, to initiate or perform one or more functions associated with managing catalogs based on their respective roles.

Additionally, the per tenant catalog CMS 328 may be in communication with the external services 318. For example, a service among the external services 318 may be a proprietary suite of online storefront management services, including subcomponents such as a storefront user interface building/updating tool and a dashboard for managing sales operations as orders, payments, and/or shipping. Accordingly, contents and data uploaded via the per tenant catalog CMS 328 may be communicated to one or more of the external services 318 for integration. Data maintained by one or more of the external services 318 may also be communicated to the per tenant catalog CMS 328 in order to, for example, allow tenants to view and/or evaluate. The communication between the per tenant catalog CMS 328 and the external services 319 may be performed by, for example, storefront combination API 326, and/or data exchange over the one or more networks 101.

At the server system 300, the one or more customer service employees 310 may access an external customer service portal 330 and/or an in-house customer service portal 332. The one or more customer service employees 310 authorized for such access may be one or more employees associated with the customer support services of the CaaS electronic platform of the server system 300. The external customer service portal 330 may be a portal for accessing one or more external components which may include, for example, various computer-implemented features such as interactive customer support, targeted campaigns, live chat support, call center support, and web-based messaging with users. In some implementations, the external customer service portal 330 may correspond to the customer support systems 236, being accessed by employee devices 202, as depicted in FIG. 2. The in-house customer service portal 332 may be a portal internally built into the server system 300. The in-house customer service portal 332 may include, for example, user interfaces for the one or more customer service employees 310 to initiate, view, manage, and/or perform one or more of the microservices 356 associated with customer support tasks.

At the server system 300, the one or more marketer employees 312 may access an ads administration portal 334, an external marketing portal 336, and an in-house marketing portal 338. The one or more marketer employees 312 authorized for such access may be one or more employees associated with marketing services of the CaaS electronic platform of the server system 300. The ads administration portal 334 may include one or more user interfaces at which one or more marketer employees 312 may initiate, view, or manage administrative tasks related to advertisements. The ads administration portal 334 may communicate with microservices 356, including, for example, marketing APIs 366, for exchanging data associated with campaign tracking, user segmentation, etc. The ads administration portal 334 may also communicate with external services 318, including, for example, external analytics services, external ads conversion tracking services, etc. The external marketing portal 336 may be a portal for accessing one or more external components which may include, for example, various computer-implemented features such as marketing automation and analytics software for email, mobile, social and online marketing. In some implementations, the external marketing service portal 336 may correspond to the email marketing systems 246, being accessed by employee devices 202, as depicted in FIG. 2. The in-house marketing portal 338 may be a portal internally built into the server system 300. The in-house marketing portal 338 may be include, for example, user interfaces for the one or more marketer employees 312 to initiate, view, or manage one or more microservices 356 associated with marketing tasks such as campaign tracking, incentive management, user segmentation data, etc.

At the server system 300, the warehouse staff 314 may access a warehouse operation portal 340. The warehouse staff 314 authorized for such access may be one or more employees associated with warehouse operations of the CaaS electronic platform of the server system 300. Accordingly, the warehouse portal 340 may include one or more user interfaces at which warehouse staff 314 may, for example, initiate, view, manage, enter data in, or perform administrative tasks related to warehouse operations. The warehouse portal 340 may communicate with microservices 356, including, for example, warehouse APIs 370. Among the warehouse APIs 370, service components that may communicate with the warehouse operation portal 340 may be, for example, order processing, item photoshoot, inventory, inventory location, garment allocation, order fulfillment, shipping label management, package and shipment operations, return processing, laundry, and cycle count.

The external customer service portal 330, the in-house customer service portal 332, the ads administration portal 334, the external marketing portal 336, the in-house marketing portal 338, and the warehouse operation portal 340 may each communicate with various service components of the microservices 342 and/or the external services 318, via back office combination APIs 342 and/or one or more networks 101. In some implementations, the back office combination APIs 342 may correspond to API access communication links 250, 252, and/or 254, depicted in FIG. 2. Additionally, in some implementations, the portals 330-340 may correspond to one or more internal apps 216 and/or external systems 212, depicted in FIG. 2.

Within the server system 300, a group of hosts (e.g., computing resources) may form a job execution cluster 344. The job execution cluster 344 may utilize the combined computing power and shared resources of the hosts to process one or more jobs (e.g., workloads) of the server system 300. The job execution cluster 344 may, for example, dynamically allocate the combined computing power and the shared resources of the hosts, to perform one or more jobs associated with storefront or back office tasks. For a plurality of different jobs, the allocation of the computing power and the resources may be prioritized based on predetermined criteria, such as, for example, criticality, cost, time/order of receipt, and/or urgency.

The job execution cluster 344 may be configured to execute storefront jobs 346 and back office jobs 348. Storefront jobs 346 may configure the job execution cluster 344 to perform background tasks triggered by actions of users 306 at the tenant storefront 322. For example, if a first user among the users 306 initiated an order for one or more garment for shipment to the first user, the job execution cluster 344 may execute a series of tasks under storefront jobs 346, such as, calling the relevant APIs among the microservices 356 (e.g., password login, size advisor, personalized discovery, recommendation, garment pricing, tax processing, IP location, address validation, order processing, shipment label, shipment tracking, fulfillment, package and shipment, etc.), storing transactional data resulting from the execution of the microservices into relevant data repositories among the databases 374-380, logging system events resulting from execution of microservices at local logs (e.g., storing at local logs 382), and calling external service components (e.g., relevant service components from external services 318 and/or 320). Accordingly, storefront jobs 346 may be performed on demand at the server system 300, whenever a customer action is received at the tenant storefront 322.

Back office jobs 348 may configure the job execution cluster 344 to perform tasks such as, but not limited to, periodic data refresh 350, periodic synchronization states 352, and automated background tasks 354. In some implementations, back office jobs 348 may correspond to back office jobs 228 depicted in FIG. 2. The job execution cluster 344 may execute jobs scheduled under periodic data refresh 350, in accordance with one or more predetermined data refresh schedules. During each iteration of a job under periodic data refresh 350, applicable variable data (e.g., metrics, scores, recommendation outputs, prices, etc.) stored in databases 374-380 may be refreshed based on the values of the input parameters captured at the time of execution. For example, periodic data refresh 350 may refresh the values and/or data associated with matching and fulfillment operations, pricing, achievable service level (ASL) and item retirement, discovery and recommendation, and other data science jobs.

The job execution cluster 344 may also execute one or more jobs scheduled under periodic synchronization states 352. For example, a job under periodic synchronization states 352 may synchronize states between the in-house service components (e.g., microservices 356) and the external states (e.g., external services 318 and 320). Additionally, the job execution cluster 344 may execute one or more jobs scheduled under automated background tasks 354. One or more jobs under automated background tasks 354 may be, for example, tasks triggered from portals 330-340 based on actions of employees 310, 312, and 314. In some implementations, a job under automated background tasks 354 may also be generated in response to an action of one or more tenants 308 at the per tenant catalog CMS 328.

The server system 300 may include microservices 356 that are available for deployment as APIs. In some implementations, microservices 356 may correspond to the tenant aware services 224 depicted in FIG. 2. Thus, the microservices 356 may be services hosted at the virtual private clouds, as shown in FIG. 2. The microservices 356 may include, for example, catalog 358, data service APIs 360, account 362, customer APIs 364, marketing APIs 366, other supporting APIs 368, and warehouse APIs 370.

Catalog 358 may include service components such as, for example, products (e.g., item attributes and identifiers), collections (e.g., groups of products), and/or size charts (e.g., size charts specific to tenants 308, or canonical sizes set internally for server system 300).

Data service APIs 360 may include service components such as, for example, size advisor (e.g., service to advise recommended size(s) for a particular user for a garment, based on data associated with the user and the garment), personalized discovery (e.g., personalized service indicating results of discovery for a particular user), recommendation (e.g., recommendation of garments for a user according to what she may like, recommendation of similar garments to a product the user is interested in, recommendation of garments that other users liked who have had similar experiences to the user, or recommendation of the user's returned favorite(s) for the user to buy), garment pricing (e.g., a pricing engine for each garment or for each order), and/or a user profile (e.g., services for generating, updating, or viewing user profile(s)).

Account 362 may include service components such as, for example, new account creation, password login, social network login, password reset, single sign-on function(s), and/or session renewal function(s).

Customer APIs 364 may include service components such as, for example, user information management for users 306, subscription (e.g., settings, preferences, or subscription choices of users 306), size profile (e.g., creating or managing size profile information for a particular user), closet (e.g., placing one or more garments into a virtual closet), shipment tracking, at home garments (e.g., viewing or managing garments currently marked as at home), garments transaction (e.g., rental, purchase, or return transactions one or more garments), return notification (e.g., an interface configured to receive from users 306 notification(s) to return item(s)), feedback (e.g., an interface configured to receive from users 306 feedback regarding specific transactions, services, item sizes, etc.), product review (e.g., an interface configured to receive from users 306 review of specific items), history, referral (e.g., users 306 referring other potential users), and/or gift subscription (e.g., subscribing one or more users 306 based on a gift balance).

Marketing APIs 366 may include service components such as, for example, campaign tracking (e.g., monitoring or evaluating advertisements and/or marketing analytics), incentive management (e.g., data associated with dynamically managed incentives for users 306 joining or performing any other incentivized activity), and/or user segmentation (e.g., data associated with users segmented for marketing purposes).

Other supporting APIs 368 may include service components such as, for example, tax (e.g., tax computations for transactions), IP location (e.g., locating users 306 based on Internet Protocol address of user devices 204), and/or address validation (e.g., validating mailing addresses of users 306 during transactions).

Warehouse APIs 370 may include service components such as, for example, order processing, photoshoot (e.g., capturing electronic images of items being made available for rental or purchase transactions), inventory (e.g., computer-implemented functions associated with inventory management of items to be rented or purchased), inventory location (e.g., locating item in an inventory at a warehouse), garment allocation (e.g., allocating certain items for shipment to a particular user), fulfillment (e.g., fulfilling initiated orders), shipping label (e.g., generating, modifying, or outputting shipping labels), package and shipment (e.g., computer-implemented functions associated with packaging, sorting, and/or delivering the shipments out to users 306), return processing (e.g., processing return items that have been received at a warehouse), laundry (e.g., computer-implemented functions associated with performing laundry of the returned items), and/or cycle count (e.g., computer-implemented functions associated with counting cycles that each wearable item have gone through).

At the server system 300, the microservices 356 may be in communication with a plurality of databases, including, for example, transactional database 374, storage for batch/dump data 376, storage for optimized product search and recommendations 378, event message queue 380, and local logs 382. The transactional database 374 may include data repositories dynamically updated based on user transactions, such as, for example, product OLTP (online transaction processing) database and/or business intelligence database. In some implementations, the transactional database 374 may support API communications with microservices 356 and/or the tenant storefront 322, in order to exchange transactional data.

The storage for batch/dump data 376 may be a database which stores data produced by batch jobs executed at the server system 300. For example, the storage for batch/dump data 376 may store a batch of replenishment identifiers periodically output by a service component associated with item replenishment (e.g., return processing component at the warehouse APIs 370), or a batch of match setup files periodically output by matching setup engines (e.g., a back office job of server system 300 which periodically matches wearability metrics to each data pair of a user identifier and an item identifier). In some implementations, when a first process produces a batch data and stores them at the batch/dump data 376, a second process may be scheduled to retrieve the batch data later for a subsequent use.

The storage for optimized product search and recommendations 378 may include data management components and/or databases such as, for example, Elasticsearch, Hbase, or any other types of data search/storage components capable of indexing, retrieving, and/or searching documents, or functioning as key-value-pair stores. For example, the storage for optimized product search and recommendations 378 may be used to store and index data sets produced by an "offline" processes (e.g., processes that run independently of periodically executed back office jobs), and make those stored data sets available for specific retrieval requests (e.g., requests including specific queries).

The event message queue 380 may be a database in communication with the microservices 356, and it may serve as a message broker for event messages occurring between different components within the server system 300. For example, the event message queue 380 may store various event messages received from one or more components, until a receiving component connects and takes an event message off the queue. Accordingly, the event message queue 380 may be a database used as a tool for distributing messages to multiple recipient components, and effectively and quickly balancing loads between components.

The local logs 382 may be in communication with the microservices 356. The local logs 382 may be one or more databases that records system events associated with the microservices 356. In some implementations, the local logs 382 may be configured in such a way that all system events are recorded. Alternatively, the local logs 382 may be configured with preset conditions dictating which system events are to be recorded.

The local logs 382 may be in communication with a log processing engine 384. The log processing engine 384 may function as an intermediary data processing engine between the local logs 382 and a centralized indexed log repository 386. For example, the log processing engine 384 may collect data from the local logs 382, transform and/or rearrange the data in a predetermined format (e.g., based on a preset rule for conditionally deciphering, eliminating, deriving, or converting certain types of data), and converge such data into the centralized indexed log repository 386. The centralized indexed log repository 386 may be accessed by one or more internal engineers and/or one or more DevOps processes led by one or more internal engineers.

At the server system 300, an ETL system 388 may extract, transform, and load various data outputs into a data warehouse 390, so that the data warehouse 390 may serve as a unified source of data that are used for business intelligence or business analytics. For example, the ETL system 388 may collect data from multiple different sources (e.g., data stores from external services 320, transactional database 374, and storage for batch/dump data 376), convert the collected data to preset formats, and load the data into the data warehouse systems 390. In some implementations, the data warehouse 390 may correspond to the data warehouse systems 230 depicted in FIG. 2.

As shown in FIG. 3, the data warehouse 390 may be in communication with a report server 391. The report server 391 may be an external (e.g., third party) data visualization engine which may be configured to collect data from data warehouse 390 and generate reports focused on business intelligence and analytics. Reports may be scheduled and/or automated with preconfigured settings (e.g., applicable time periods, input parameters, output metrics, output format, etc.), to produce scheduled reports 395. Additionally, or alternatively, ad hoc requests may be received from one or more internal analysts 392 of the CaaS electronic platform via one or more report client applications 393 at an employee device (e.g., employee device 116), and the report server 391 may respond to those ad hoc requests by generating and communicating ad hoc reports 394 via the report client applications 393. In addition to the one or more internal analysts 392, other employees authorized to view and analyze reports, such as internal account representatives and tenant stakeholders 396, may access the scheduled reports 395 and/or ad hoc reports 394.

The number and arrangement of devices, components, and communication networks shown in FIG. 3 are provided as an example. In practice, there may be additional devices, components, and/or communication networks, fewer devices, components, and/or communication networks, different devices, components, and/or communication networks, or differently arranged devices, components, and/or communication networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) associated with the server system 300 may perform one or more functions described as being performed by another set of devices associated with the server system 300.

Figure 4:
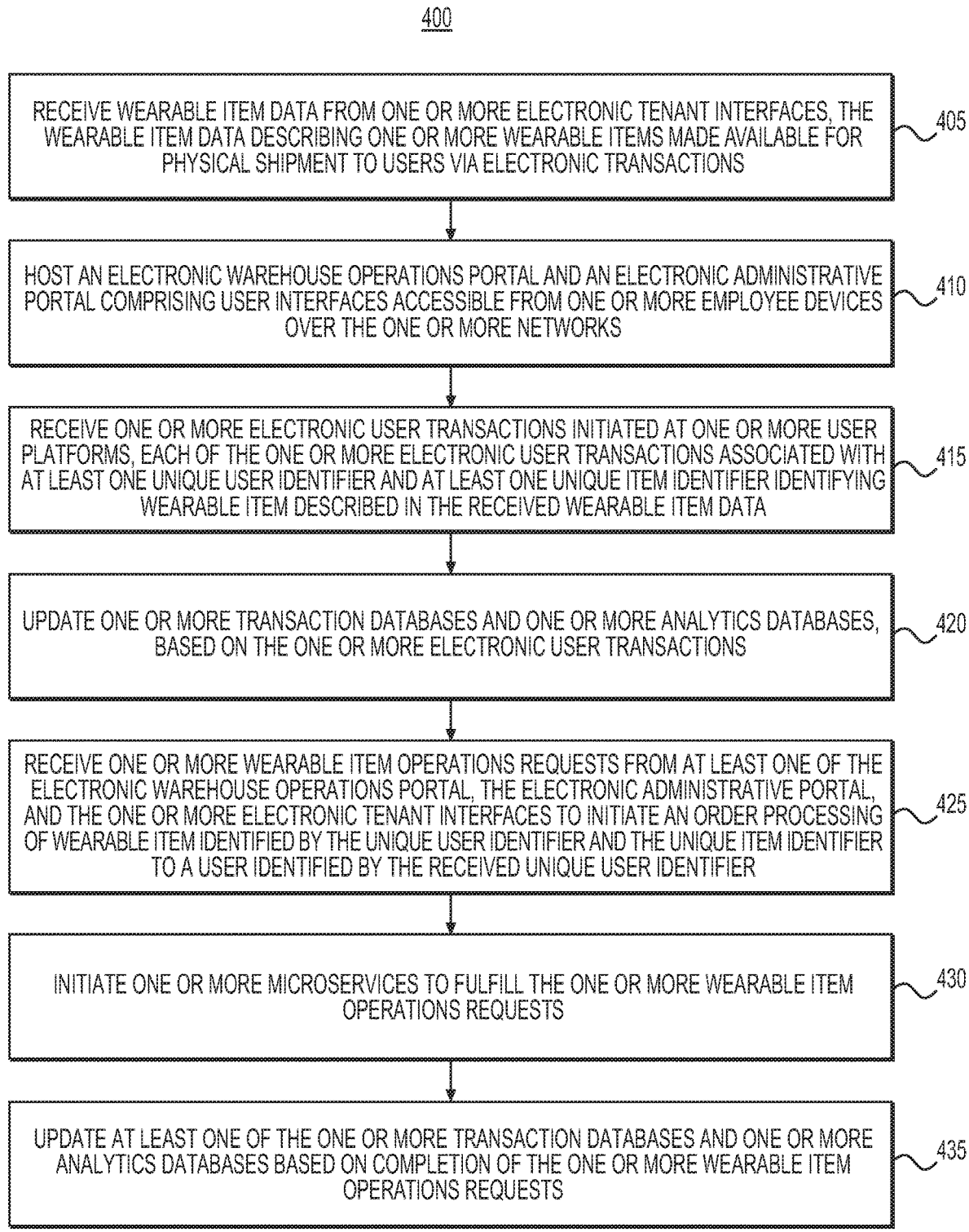
FIG. 4 depicts an exemplary method for dynamically managing data associated with transactions of wearable items, according to one or more embodiments.

FIG. 4 depicts an exemplary method 400 for dynamically managing data associated with transactions of wearable items, according to one or more embodiments. As shown in the exemplary method 400, the server system (e.g., the server system 102 or the server system 300) may first receive wearable item data from one or more electronic tenant interfaces (e.g., per tenant catalog CMS 328 or internal apps 216), the wearable item data describing one or more wearable items made available for physical shipment to users via electronic transactions, wherein the one or more electronic tenant interfaces comprise one or more web-based user interfaces accessible from one or more tenant devices (e.g., tenant devices 120 or employee devices 202) over one or more networks (Step 405).

Additionally, the server system (e.g., the server system 102 or the server system 300) may host an electronic warehouse operations portal (e.g., the warehouse operation portal 340) and an electronic administrative portal (e.g., the external portals 316, the external customer service portal 330, the in-house customer service portal 332, the ads administration portal 334, the external marketing portal 336, or the in-house marketing portal 338), the electronic warehouse operations portal and electronic administrative portal comprising web-based user interfaces (e.g., the internal apps 216) accessible from one or more employee devices (e.g., the employee devices 116 or the employee devices 202) or over the one or more networks (Step 410).

The server system (e.g., the server system 102 or the server system 300) may receive one or more electronic user transactions initiated at one or more user platforms (e.g., the tenant storefront 322), each of the one or more electronic user transactions associated with at least one unique user identifier and at least one unique item identifier identifying wearable item described in the received wearable item data, wherein the one or more user platforms comprise one or more user interfaces (e.g., the external consumer facing applications 208, or any web-based user interfaces) accessible from one or more user devices (e.g., the user devices 112 or the user devices 204) over the one or more networks (Step 415). The one or more electronic user transactions may comprise, for example, an order placement, an order tracking, and/or return notification. In the process of receiving the one or more electronic user transactions, the server system may receive data from one or more external systems (e.g., the external systems 212 or the external services 318 and 320), using one or more APIs, at the one or more web-based user interfaces of the one or more user platforms. The one or more APIs may comprise, for example, a payment API, a customer API, and/or an advertisement API.

In response to receiving the one or more electronic user transactions, the server system (e.g., the server system 102 or the server system 300) may update one or more transaction databases (e.g., the transactional database 374, the storage for batch/dump data 376, the event message queue 380, or the local logs 382) and one or more analytics databases (e.g., the storage for batch/dump data 376 or the storage for optimized product search and recommendations 378), based on the one or more electronic user transactions (Step 420).

The server system (e.g., the server system 102 or the server system 300) may also receive one or more wearable item operations requests from at least one of the electronic warehouse operations portal (e.g., the warehouse operation portal 340), the electronic administrative portal (e.g., the external portals 316, the external customer service portal 330, the in-house customer service portal 332, the ads administration portal 334, the external marketing portal 336, or the in-house marketing portal 338), and the one or more electronic tenant interfaces (e.g., per tenant catalog CMS 328 or internal apps 216) to initiate order processing of a wearable item identified by the unique user identifier and the unique item identifier for a user identified by the received unique user identifier (Step 425).

In response to receiving the one or more wearable item operations requests, the server system (e.g., the server system 102 or the server system 300) may initiate one or more microservices (e.g., the microservices 356) to fulfill the one or more wearable item operations requests (Step 430). The microservices may comprise, for example, order processing, inventory location, garment allocation, fulfillment, and return processing.

Additionally, the server system (e.g., the server system 102 or the server system 300) may update at least one of the one or more transaction databases and one or more analytics databases based on completion of the one or more wearable item operations requests (Step 435). The server system may then consolidate data from the one or more transaction databases, the one or more analytics databases, and one or more external systems, into one or more data warehouse systems (e.g., the data warehouse systems 230 or the data warehouse 390). Based on the consolidated data, the server system may also generate one or more of an ad hoc report (e.g., the ad hoc reports 394) and a scheduled report (e.g., the scheduled reports 395), for entities such as internal analyst 392 or internal account representative and tenant stakeholder 396.

Although FIG. 4 shows example blocks of an exemplary method 400, in some implementations, the exemplary method 400 may include additional blocks, fewer blocks, different blocks, or differently arranged blocks than those depicted in FIG. 4. Additionally, or alternatively, two or more of the blocks of the exemplary method 400 may be performed in parallel.

Figure 5:
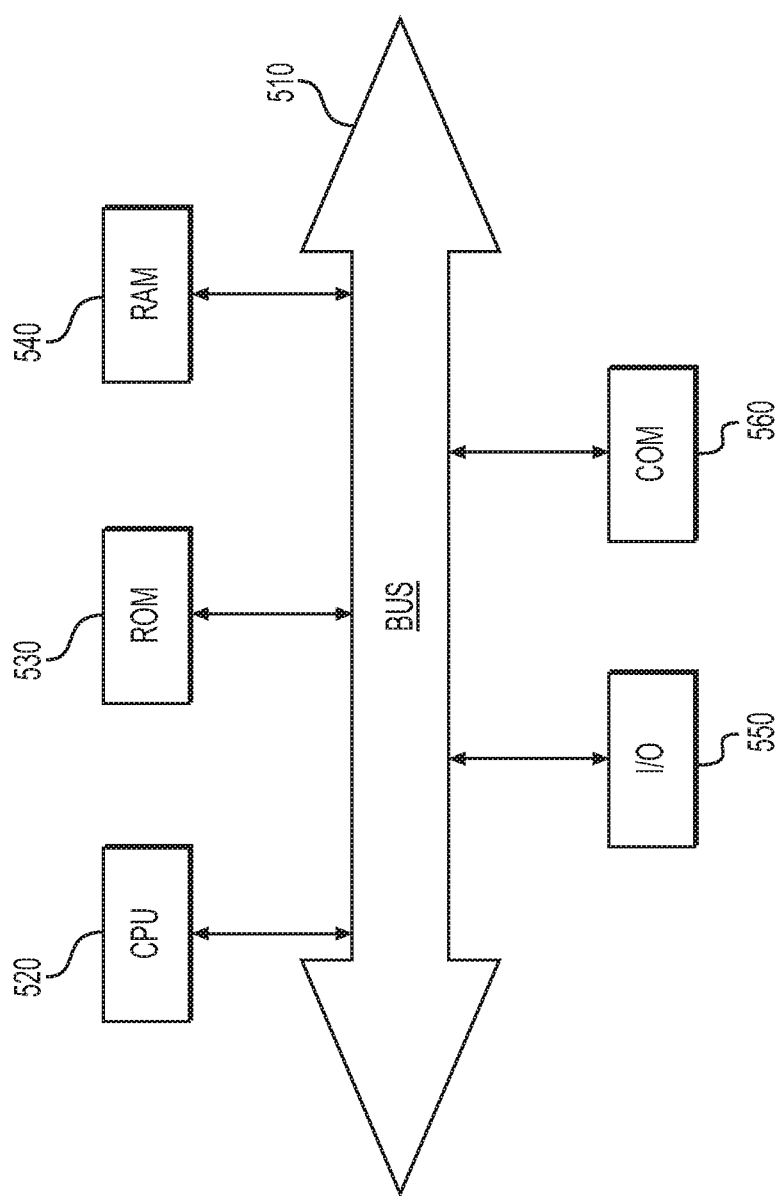
FIG. 5 depicts an exemplary computer device or system, in which embodiments of the present disclosure, or portions thereof, may be implemented.

FIG. 5 depicts an exemplary computer device or system, in which embodiments of the present disclosure, or portions thereof, may be implemented. In some implementations, the server system 102, the user devices 112, the employee devices 116, the tenant devices 120, the employee devices 202, the user devices 204, the internal system 206, the external systems 212, the server system 300, and/or any other computer system or user terminal for performing the various embodiments of the present disclosure, may correspond to device 500. Additionally, each of the exemplary computer servers, databases, user interfaces, modules, and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-4, may be implemented using a processor device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, a device 500 used for performing the various embodiments of the present disclosure (e.g., the server system 102, the user devices 112, the employee devices 116, the tenant devices 120, the employee devices 202, the user devices 204, the internal system 206, the external systems 212, the server system 300, and/or any other computer system or user terminal for performing the various embodiments of the present disclosure) may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 may be connected to a data communication infrastructure 510, for example, a bus, message queue, network, or multi-core message-passing scheme.

A device 500 (e.g., the server system 102, the user devices 112, the employee devices 116, the tenant devices 120, the employee devices 202, the user devices 204, the internal system 206, the external systems 212, the server system 300, and/or any other computer system or user terminal for performing the various embodiments of the present disclosure) may also include a main memory 540, for example, random access memory (RAM), and may also include a secondary memory 530. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

A device 500 may also include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. A device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for dynamically managing data associated with electronic transactions of wearable items, the method comprising:

receiving, by one or more processors, wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks;

hosting, by the one or more processors, a wearable items warehouse operations portal, a customer service portal, and a marketing portal, each associated with providing the wearable items as a service, the wearable items warehouse operations portal, the customer service portal, and the marketing portal each comprising a user interface accessible from one or more employee devices over the one or more networks;

receiving, by the one or more processors, one or more electronic user transactions initiated at one or more user platforms for subscribing to, purchasing, or renting one or more of the wearable items provided as a service, each of the one or more electronic user transactions associated with at least one unique user identifier and at least one unique item identifier identifying wearable items described in the received wearable item data, wherein the one or more user platforms comprise one or more user interfaces accessible from one or more user devices over the one or more networks;

in response to receiving the one or more electronic user transactions for the one or more wearable items provided as a service, updating, by the one or more processors, one or more transaction databases and one or more analytics databases, based on the one or more electronic user transactions;

periodically synchronizing, by the one or more processors, a state of one or more microservices for providing the wearable items as a service and one or more external services, in response to tasks triggered by each of the wearable items warehouse operations portal, the customer service portal, and the marketing portal, by an action of the one or more employee devices, the one or more external services including a storefront service for managing a storefront for the wearable items provided as a service for a particular tenant;

maintaining one or more data warehouse systems, by the one or more processors, comprising data consolidated from the one or more transaction databases, the one or more analytics databases, and one or more external systems;

generating, by the one or more processors, an electronic display based on the consolidated data and based on a request for an analytics report received from the one or more employee devices, the consolidated data including data from the one or more updated analytics databases which was updated based on at least an action of the one or more employee devices via the wearable items warehouse portal, wherein the electronic display is accessible from the one or more employee devices;

receiving, by one or more processors, one or more wearable item operations requests associated with providing the wearable items as a service, from at least one of the wearable items warehouse operations portal, the customer service portal, the marketing portal, and the one or more electronic tenant interfaces to initiate order processing of a wearable item identified by the unique user identifier and the unique item identifier for a user identified by the received unique user identifier;

in response to receiving the one or more wearable item operations requests to initiate order processing of the wearable item identified by the unique user identifier and the unique item identifier, initiating the one or more microservices to fulfill the one or more wearable item operations requests received from at least one of the wearable items warehouse operations portal, the customer service portal, the marketing portal, and the one or more electronic tenant interfaces; and updating the one or more transaction databases and the one or more analytics databases based on completion of the one or more wearable item operations requests.

2. The method of claim 1, wherein the one or more electronic user transactions comprise at least one of an order placement, an order tracking, and a return notification associated with subscribing to, purchasing, or renting one or more of the wearable items provided as a service.

3. The method of claim 1, wherein the one or more microservices for providing the wearable items as a service comprise at least one of order processing, inventory location, garment allocation, fulfillment, and return processing.

4. The method of claim 1, wherein the analytics report is an ad hoc report or a scheduled report.

5. The method of claim 1, further comprising receiving data from the one or more external systems, using one or more application programming interfaces (APIs), at the one or more user interfaces of the one or more user platforms.

6. The method of claim 5, wherein the one or more application programming interfaces (APIs) comprise at least one of a payment API, a customer service API, and an advertisement API.

7. The method of claim 1, wherein the marketing portal user interface provides access to a microservice for incentive management.

8. The method of claim 1, wherein the one or more analytics databases is updated with user identifier and item identifier data pairs, and wherein the one or more processors periodically matches wearability metrics to each user identifier and item identifier data pairs.

9. The method of claim 1, further comprising receiving data from the one or more external systems using one or more application programming interfaces (APIs) at the one or more user interfaces of the one or more user platforms, wherein the one or more application programming interfaces (APIs) include an API having a service component configured to count cycles for each wearable item.

10. A computer system dynamically managing data associated with transactions of wearable items, the computer system comprising:

a memory having processor-readable instructions stored therein; and at least one processor configured to access the memory and execute the processor-readable instructions, which when executed by the at least one processor configures the at least one processor to perform a plurality of functions, including functions for:

receiving wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks;

hosting a wearable items warehouse operations portal, a customer service portal, and a marketing portal, each associated with providing the wearable items as a service, the wearable items warehouse operations portal, the customer service portal, and the marketing portal each comprising a user interface accessible from one or more employee devices over the one or more networks;

receiving one or more electronic user transactions initiated at one or more user platforms for subscribing to, purchasing, or renting one or more of the wearable items provided as a service, each of the one or more electronic user transactions associated with at least one unique user identifier and at least one unique item identifier identifying wearable items described in the received wearable item data, wherein the one or more user platforms comprise one or more user interfaces accessible from one or more user devices over the one or more networks;

in response to receiving the one or more electronic user transactions for the one or more wearable items provided as a service, updating one or more transaction databases and one or more analytics databases, based on the one or more electronic user transactions;

periodically synchronizing a state of one or more microservices for providing the wearable items as a service and one or more external services, in response to tasks triggered by each of the wearable items warehouse operations portal, the customer service portal, and the marketing portal, by an action of the one or more employee devices, the one or more external services including a storefront service for managing a storefront for the wearable items provided as a service for a particular tenant;

maintaining one or more data warehouse systems comprising data consolidated from the one or more transaction databases, the one or more analytics databases, and one or more external systems;

generating an electronic display based on the consolidated data and based on a request for an analytics report received from the one or more employee devices, the consolidated data including data from the one or more updated analytics databases which was updated based on at least an action of the one or more employee devices via the wearable items warehouse portal, wherein the electronic display is accessible from the one or more employee devices;

receiving one or more wearable item operations requests associated with providing the wearable items as a service, from at least one of the wearable items warehouse operations portal, the customer service portal, the marketing portal, and the one or more electronic tenant interfaces to initiate order processing of a wearable item identified by the unique user identifier and the unique item identifier for a user identified by the received unique user identifier;

in response to receiving the one or more wearable item operations requests to initiate order processing of the wearable item identified by the unique user identifier and the unique item identifier, initiating the one or more microservices to fulfill the one or more wearable item operations requests received from at least one of the wearable items warehouse operations portal, the customer service portal, the marketing portal, and the one or more electronic tenant interfaces; and updating the one or more transaction databases and the one or more analytics databases based on completion of the one or more wearable item operations requests.

11. The system of claim 10, wherein the one or more electronic user transactions comprise at least one of an order placement, an order tracking, and a return notification associated with subscribing to, purchasing, or renting one or more of the wearable items provided as a service.

12. The system of claim 10, wherein the one or more microservices for providing the wearable items as a service comprise at least one of order processing, inventory location, garment allocation, fulfillment, and return processing.

13. The system of claim 10, wherein the analytics report is an ad hoc report or a scheduled report.

14. The system of claim 10, wherein the plurality of functions further comprise:
receiving data from the one or more external systems, using one or more application programming interfaces (APIs), at the one or more user interfaces of the one or more user platforms.

15. The system of claim 14, wherein the one or more application programming interfaces (APIs) comprise at least one of a payment API, a customer service API, and an advertisement API.

16. A non-transitory computer-readable medium containing instructions for dynamically managing data associated with transactions of wearable items, comprising:

receiving wearable item data from one or more electronic tenant interfaces, the wearable item data describing one or more wearable items made available for physical shipment to users via electronic transactions, wherein the one or more electronic tenant interfaces comprise one or more user interfaces accessible from one or more tenant devices over one or more networks;

hosting a wearable items warehouse operations portal, a customer service portal, and a marketing portal, each associated with providing the wearable items as a service, the wearable items warehouse operations portal, the customer service portal, and the marketing portal each comprising a user interface accessible from one or more employee devices over the one or more networks;

receiving one or more electronic user transactions initiated at one or more user platforms for subscribing to, purchasing, or renting one or more of the wearable items provided as a service, each of the one or more electronic user transactions associated with at least one unique user identifier and at least one unique item identifier identifying wearable items described in the received wearable item data, wherein the one or more user platforms comprise one or more user interfaces accessible from one or more user devices over the one or more networks;

in response to receiving the one or more electronic user transactions for the one or more wearable items provided as a service, updating one or more transaction databases and one or more analytics databases, based on the one or more electronic user transactions;

periodically synchronizing a state of one or more microservices for providing the wearable items as a service and one or more external services, in response to tasks triggered by each of the wearable items warehouse operations portal, the customer service portal, and the marketing portal, by an action of the one or more employee devices, the one or more external services including a storefront service for managing a storefront for the wearable items provided as a service for a particular tenant;

maintaining one or more data warehouse systems comprising data consolidated from the one or more transaction databases, the one or more analytics databases, and one or more external systems;

generating an electronic display based on the consolidated data and based on a request for an analytics report received from the one or more employee devices, the consolidated data including data from the one or more updated analytics databases which was updated based on an action of the one or more employee devices via the wearable items warehouse portal, wherein the electronic display is accessible from the one or more employee devices;

receiving one or more wearable item operations requests associated with providing the wearable items as a service, from at least one of the wearable items warehouse operations portal, the customer service portal, the marketing portal, and the one or more electronic tenant interfaces to initiate order processing of a wearable item identified by the unique user identifier and the unique item identifier for a user identified by the received unique user identifier;

in response to receiving the one or more wearable item operations requests to initiate order processing of the wearable item identified by the unique user identifier and the unique item identifier, initiating the one or more microservices to fulfill the one or more wearable item operations requests received from at least one of the wearable items warehouse operations portal, the customer service portal, the marketing portal, and the one or more electronic tenant interfaces; and updating of the one or more transaction databases and the one or more analytics databases based on completion of the one or more wearable item operations requests.

17. The non-transitory computer-readable medium of claim 16, wherein the one or more electronic user transactions comprise at least one of an order placement, an order tracking, and a return notification associated with subscribing to, purchasing, or renting one or more of the wearable items provided as a service.

18. The non-transitory computer-readable medium of claim 16, wherein the one or more microservices for providing the wearable items as a service comprise at least one of inventory location and return processing.

19. The non-transitory computer-readable medium of claim 16, wherein the analytics report is an ad hoc report or a scheduled report.

20. The non-transitory computer-readable medium of claim 16, further comprising:

receiving data from the one or more external systems, using one or more application programming interfaces (APIs), at the one or more user interfaces of the one or more user platforms.

* * * * *